United States Patent [19]

Parel

[11] Patent Number: 4,483,186

[45] Date of Patent: Nov. 20, 1984

[54] PROCESS FOR CHECKING AND ADJUSTING CARBURETORS IN SITU

[75] Inventor: Jacques Parel, Chatou, France

[73] Assignee: Societe Industrielle de Brevets et d'Etudes S.I.B.E., Nanterre, France

[21] Appl. No.: 420,350

[22] Filed: Sep. 20, 1982

[30] Foreign Application Priority Data

Sep. 30, 1981 [FR] France ..................... 81 18484

[51] Int. Cl.[3] ..................... G01M 15/00

[52] U.S. Cl. ..................... 73/118

[58] Field of Search ..................... 73/118, 861.51, 199, 73/49.7; 251/121, 123, 124

[56] References Cited

U.S. PATENT DOCUMENTS 2,494,936 1/1950 Edelen ..................... 73/49.7 X 4,050,428 9/1977 Masaki ..................... 73/118 A X 4,269,062 5/1981 Smitley ..................... 73/118

*Primary Examiner*—Jerry W. Myracle

*Attorney, Agent, or Firm*—Larson and Taylor

[57] ABSTRACT

For determining the amount of wear of the movable parts of a carburetor, the throttle of the carburetor is retained in a position where it defines a predetermined cross-sectional flow area with the whole of the induction passage. That predetermined area is the area for which, when the carburetor was new, the edge of the throttle was midway along the bypass aperture of the idling circuit. The degree of vacuum in the idling circuit of the carburetor is then compared with a reference value which is the degree of vacuum which prevails on the carburetor in brand new condition under the same operating conditions.

4 Claims, 3 Drawing Figures

PROCESS FOR CHECKING AND ADJUSTING CARBURETORS IN SITU

BACKGROUND AND SUMMARY OF THE INVENTION

The present invention relates to processes and apparatuses for checking carburetors for internal combustion engines, of the type comprising an idling circuit opening into the intake passage of the carburetor through an idling orifice placed downstream of the minimum opening position of an operator operable throttle and through bypass aperture means. The bypass aperture means, in the form of a slit or of holes distributed along the intake duct, ensures correct operation of the engine when the driver opens the throttle, generally formed by a butterfly valve, from its minimum opening position.

The wear of the moving parts of the carburetor, essentially the shaft of (or the support for the shaft of) the butterfly valve, causes clearance and lost motion which shifts the edge of the butterfly valve with respect to the bypass aperture means. Since such shifting causes operating abnormalities, it is desirable to detect it. Thus it may be determined if operating defects of the engine are due to wear and, if so, which repairs or replacements must be carried out.

Unfortunately, it is difficult to assess the extent of wear of the shaft or if its support by visual inspection, even during normal maintenance on the vehicle and attendant removal of the air filter, for the extent of wear which is acceptable is small. It is consequently frequently necessary to remove the carburetor and to measure directly the extent of wear. It is also possible to measure air and/or fuel flow rates through the intake duct of the carburetor on a test bench (French Pat. No. 2,354,552). The results are not satisfactory due to the lack of a direct relation between the measurements and the extent of wear, while removal of the carburetor entails immobilization of the vehicle and the required test bench is expensive.

It is an object of the invention to provide a process and apparatus for assessing the wear of the moving parts of a carburetor while on the engine which it supplies; it is a more general object to provide for assessing the wear simply and economically.

According to an aspect of the invention, there is provided a process for assessing the wear of relatively movable parts of a carburetor in which the associated engine is operated while holding the throttle of the carburetor in a position where it defines a passage of predetermined cross-section for which, when the carburetor is new, the edge of the throttle is astride the bypass aperture means and the degree of vacuum in the idling circuit of the carburetor is compared with a reference value which is that which prevails, under the same operating conditions, in the carburetor when new.

The comparison will generally be carried out by measuring the difference between the pressure in the idling circuit and the pressure in the part which is situated between two calibrated apertures of a passageway which connects an air source at atmospheric pressure to a point in the intake duct downstream of the throttle.

The position of the throttle for the comparison may typically be adjusted while the air flow is determined by measuring the vacuum in the throat of a venturi in the intake duct. That vacuum may be compared with a standard vacuum, taken in the part situated between two calibrated apertures of a passageway connecting the atmosphere to a point downstream of the throttle.

The process is simple because it makes use of the fact new carburetors are factory adjusted, before being mounted on engines so that the vacuum in the idling circuit when the carburetor is new is accurately predetermined and reproducible. This reproducibility removes the need for a flow bench, the engine itself being able to be used as a source of vacuum and circulation pump.

According to another aspect of the invention, an apparatus for implementing the process in a simple way has means for connection with the carburetor associated together in a single hose provided with connectors and possibly with a flowrate measuring venturi which is fixed to the carburetor in place of the air filter.

SHORT DESCRIPTION OF THE DRAWINGS

DETAILED DESCRIPTION OF PREFERRED EMBODIMENTS

Figure 1:
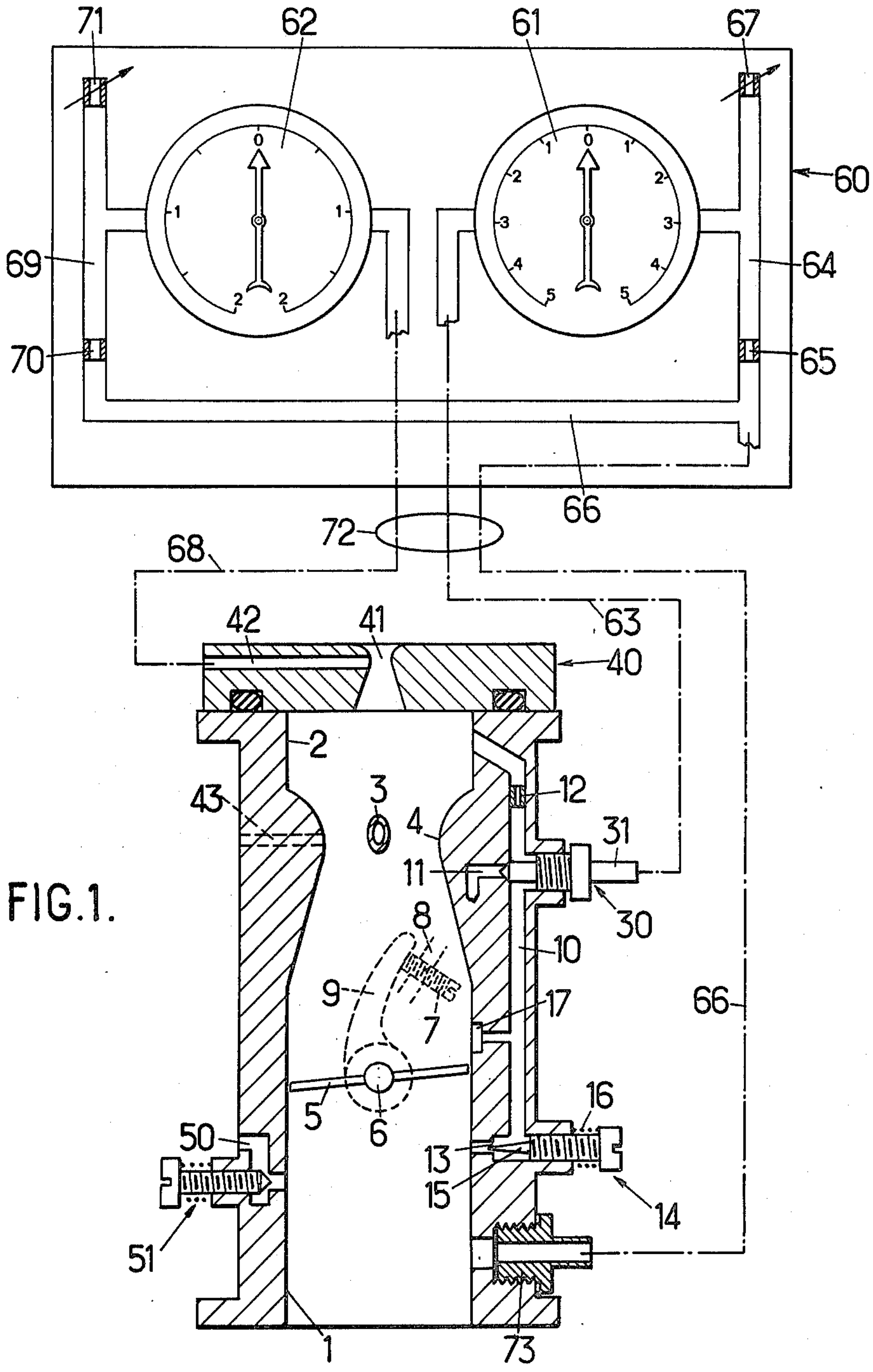
FIG. 1 is a simplified view showing the parts of a downdraught carburetor related to the invention and the essential components of an apparatus for implementing the invention.

The downdraught carburetor shown in vertical cross-section in FIG. 1 comprises a body made from several assembled parts defining an induction passage or intake duct 1 having an air input 2. The duct contains in succession from upstream to downstream in the airflow direction, the outlet of a main fuel jet system 3, placed at the throat of a venturi 4, and a throttle 5 formed by a butterfly valve carried by a shaft 6 and shown in its minimum opening position in FIG. 1. Shaft 6 passes through the body so that the butterfly valve may be controlled by the driver by means of a linkage (not shown). The minimum opening position of butterfly valve 5 is adjustable by a stop screw 7 threadedly received in a boss 8 integral with the body of the carburetor. Return springs (not shown) bias the butterfly valve back to the minimum opening position in which a lever 9 fast with shaft 6 bears against screw 7.

The idling and progression circuit of the carburetor comprises a passageway 10 supplied with air and fuel. The fuel arrives in passageway 10 from a float chamber (not shown) via channel 11. Atmospheric air is drawn through a calibrated hole 12. The idling circuit opens into the intake duct through an idling port whose cross-sectional flow area 13 is adjustable by a "richness" screw 14 with a conical tip 15, restrained by a spring 16 which holds it in position.

The idling passageway 10 also communicates with intake duct 1 through a bypass aperture formed, in the particular embodiment of FIG. 1, by a slit 17 placed so as to pass from upstream to downstream of the edge of throttle 5 when the latter is opened from the minimum opening position shown in FIG. 1. The bypass aperture may also consist of a plurality of ports distributed along the duct and close to one another.

Since the carburetor as shown has no passage for circulation of air from upstream to downstream of the throttle 5, means should be provided for feeding atmospheric air directly downstream of the throttle member 5 when carrying out the process according to a first embodiment of the invention. Such means are intended to flow the amount of air required for operation of the engine when throttle 5 is in a "closed" position, in which the flow cross-section which it defines with the duct is less than that required for the idling airflow.

Referring to FIG. 1, such means are illustrated as a duct 50 whose airflow control area is adjustable by means of a screw 51. Since the position where air enters the intake duct is of no consequence as long as it is downstream of the throttle, duct 50 is not required when the intake manifold of the engine comprises a tapping for providing an adjustable air intake when required.

Referring to FIG. 1, for easier implementation of the invention, the carburetor comprises a vacuum pick-up hole 73 situated downstream of the throttle 5. During normal operation of the carburetor, hole 73 is closed by suitable means (not shown), such as a threaded stud carrying a sealing ring.

The apparatus as shown further comprises a panel 60, a connecting hose 72 and additional parts to be connected to each carburetor to be checked in succession.

Figure 3:
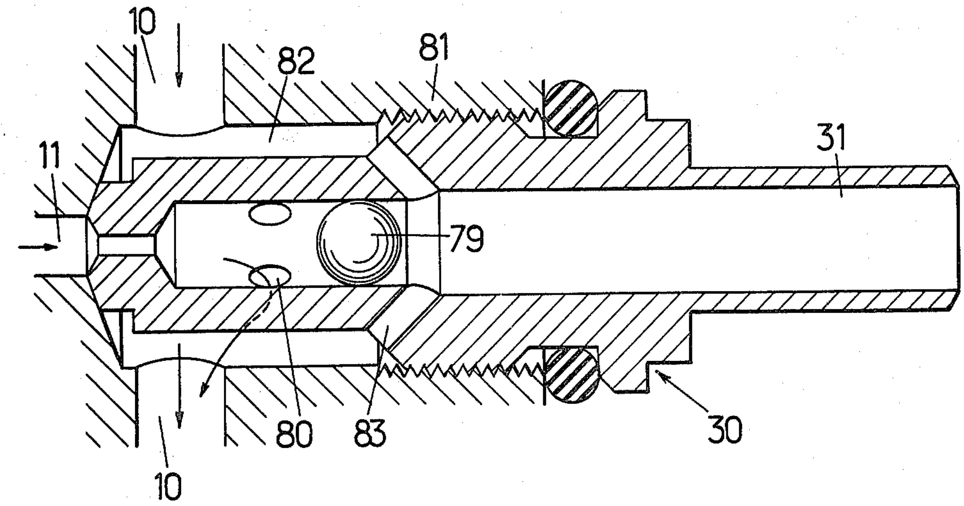
FIG. 3 shows a slow running jet with vacuum take-off suitable for use in the apparatus of FIG. 1.

The latter parts comprise an idling jet 30 having a vacuum take-off 31, that jet may be permanently fitted to the carburetor, the vacuum take-off being plugged for normal operation. Referring to FIG. 3, there is shown by way of example a jet unit which defines, with body 81 of the carburetor, an annular chamber 82 traversed by the idling passageway 10. Ports 83 through the wall of jet 30 communicate chamber 82 with the rear part of a central bore of the jet, forming a take-off passage 31 for measuring the degree of vacuum inside the idling passageway 10. The front part of that bore, separated from the rear part by a force fitted ball 79, receives fuel through a restricted passage and delivers it into passageway 10 through holes 80.

The additional parts comprise means for measuring the airflow rate drawn by the engine. In the embodiment shown in FIG. 1, these means comprise a closure plate 40 formed with a venturi 41 and a vacuum take-off passage 42 which opens at the throat of the venturi. The flow rate could also be measured by measuring the vacuum at the throat of the venturi of the carburetor through a vacuum take-off passage 43. However, a much higher accuracy may be reached with a closure plate 41 for the venturi in this plate may be of much smaller size than the normal venturi of the carburetor and the flow rates to be measured are very low, since they correspond to operation of the engine close to idling conditions.

The additional parts further comprise a vacuum take-off nipple connected to port 73.

In the embodiment illustrated in FIG. 1, panel 60 carried two differential pressure gauges 61 and 62. Gauge 62 is for adjusting the flow rate. Gauge 61 is for measuring vacuum. The pressure gauges as shown are of the pneumatic type with analog read-off. They may be replaced with pressure gauges having sensors, for example piezo-electric sensors, and a digital display, for example of the seven-segment type.

Pressure gauge 61, for measuring the depression, has a chamber connected to the vacuum take-off 31 of the idling passageway 10 through a connecting pipe 63. The other chamber is connected to that part 64 of a pipe 66 which is located between two calibrated apertures or restrictors 67 and 65, the first of which is adjustable. Pipe 66 connects an air source at atmospheric pressure to the vacuum take-off 73. Adjustment of restrictor 67 may consist of manual change of the airflow area or replacement of a restrictor with another.

One of the chambers of pressure gauge 62 is connected to the vacuum take-off passage 42 of venturi 41 through a connecting pipe 68. The other chamber of the pressure gauge 62 is connected to a part 69 of a pipe between two restrictors 71 and 70, of which the first is adjustable. The pipe extends between atmosphere and the vacuum take-off 73. In the embodiment illustrated, the pipes connected to the vacuum take-off 73 comprise a common part, downstream of restrictors 65 and 70.

The parts of pipes 68, 63 and 66 carried by panel 60 will generally be formed from rigid tubing. The balance may be flexible hoses assembled as a bundle 72 over the major part of their length.

After the pipes have been connected, the process may be carried out in several successive steps which will now be described.

1. Adjustment of the richness screw for defining a predetermined flow control area at the downstream outlet of the idling circuit The first step consists in setting the richness screw 14 in a position such that the flow control area which it defines is that previously achieved during adjustment of a brand new identical carburetor.

For that purpose, throttle 5 is brought into its closed position by completely unscrewing screw 7. The upper edge of the throttle member comes into abutment in a position where its edge is downstream of the bypass aperture 17. In this position of the butterfly valve, the vacuum which prevails in passageway 10 is practically independent of the wear of valve 5 and shaft 6.

Then screw 51 is opened and the engine is started up. Screw 51 is adjusted to an amount just sufficient to supply the air required for idling.

Restrictor 67 is then set to the size (flow area S1) previously adopted for fixing up the carburetor when new and the richness adjustment screw 14 is set to bring the differential pressure gauge 61 to zero.

Once that result has been achieved, the degree of vacuum in the idling circuit has the "standard" value as defined for a new carburetor. It might be thought that it is not possible to reach that result without a standard vacuum source in the apparatus. In fact, it has been found that fully satisfactory results can be obtained by using the engine as a vacuum source, which results in a considerable advantage as regards simplicity. The result is probably reached because, with the air/fuel mixture flowing around the cone 15 of screw 14 at sonic speed even with the degree of vacuum during idling, the degree of vacuum downstream of thottle 5 has no substantial influence on the measurement. Neither has additional air input (due for example to wear of the shaft of butterfly valve 6) influence on the measurement.

2. Adjustment of the rate of airflow to a value corresponding to a position of the edge of throttle 5 astride the bypass aperture on a brand new carburetor The next step consists in opening throttle 5, by screwing up screw 7, until the vacuum generated at the throat of venturi 41 has a standard value, defined by adjusting the restrictor 71 at a predetermined flow area S2. That vacuum is selected to correspond to a flow rate from upstream to downstream of the throttle 5 for which, when the carburetor is new, the edge of the throttle member 5 is midway of the bypass aperture 17. At the same time as the throttle is thus opened, screw 51 is closed since air intake through passage 50 is no longer necessary for operation of the engine.

Adjustment is achieved when the differential pressure gauge 62 displays zero.

3. Assessing the wear of the carburetor and throttle 5

As a general rule, displacement of the edge of throttle 5 until it confronts the bypass aperture 17 increases the degree of vacuum in the idling passageway 10 since the flow cross-sectional area subjected to the vacuum in the manifold increases and the head loss decreases.

Then, restrictor 67 is set to the size (cross-section $S'_1 \leqq S_1$) which causes a degree of vacuum to appear in part 64 equal to that which prevailed in passageway 10 of the brand new carburetor as set before the first use.

Figure 2:
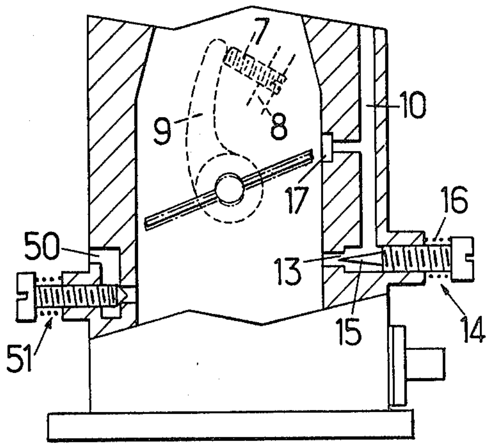
FIG. 2 shows a portion of the carburetor of FIG. 1, the throttle member being in a position in which its edge is overlapped by the bypass aperture.

Any wear of the throttle shaft or the carburetor part which supports it since it causes shift of the throttle downward (as shown in broken lines in FIG. 2) decreases the vacuum in the idling passageway 10 (since the overall flow cross-section subjected to the depression of the engine has decreased). Consequently, pressure gauge 61 is unbalanced and gives an indication as to the amount of wear. A diagnosis may be made if the carburetor should be changed or if it is sufficient to adjust it again.

4. Adjustment of the idling position of the butterfly valve

If the carburetor is considered acceptable, the stop screw for butterfly valve 5 must be set in the position giving correct idling of the engine. For that, the restrictor 71 is adjusted to a new predetermined value $S'_2 > S_2$ and the opening of butterfly valve 5 is adjusted by means of screw 7 until the indication on pressure gauge 62 is zero. The rate of airflow passing through the intake duct from upstream to downstream of the butterfly valve is then the standardized flow rate required for this adjustment.

The invention is susceptible of numerous practical embodiments. The calibrated cross-sections required for the calibrations may be provided by a plurality of preadjusted restrictors mounted on a rack incorporated in the apparatus so as to be switchable. Thus, handling is avoided which may damage the restrictors.

All means used are simple and and the method used allows information to be obtained about the condition of the carburetor and of the adjustments with great accuracy.

It is further possible with the installation to readily obtain other particular adjustments of the position of the butterfly valve. For example, the opening positions of the butterfly valve may be set before start-up of a cold engine. by adjusting the airflows by means of additional calibrated orifices 71. Similarly, the minimum opening position of a starting valve may be adjusted after start-up of a cold engine.

The apparatus provided is extremely simple and does not require a vacuum pump; high accuracy may be reached due to the differential character of the measurements. The only additional requirement as compared with prior methods is to make available restrictors having flow cross-sectional areas $S_1$, $S_2$, $S'_1$ and $S'_2$ determined for each type of carburetor before it is put on series production and mounted on engines.

In a modified embodiment, the need for step (1) above and for an air inlet on downstream part of the carburetor (passageway 50 and screw 51 in FIG. 1) is removed. On the other hand, a preliminary step consists in determining the cross-sectional flow area $S^3$ of 71 for which the following condition is fulfilled when a same carburetor in brand new condition is in place on a running engine: the degree of vacuum between 70 and 71 is equal to the degree of vacuum at the throat while:

the idling orifice 13 is closed, the edge of throttle 5 is located midway of the bypass aperture 17 in the longitudinal direction.

The carburetor to be checked is immediately subjected to step (2) as follows: screw 7 is adjusted to force throttle into a partially open position. The idling orifice is closed by substituting screw 14 with a plug (not shown). Screw 7 is then unscrewed until the airflow along throttle 5 is equal to the airflow for which, when the carburetor was new, the edge of throttle 5 was astride the bypass aperture. That adjustment is made by turning the screw until the indicator of manometer 62 is zero with restrictor 71 having the cross sectional area $S_3$.

Then, step (3) is initiated. Restrictor 67 is given the cross-sectional area $S_4$ for which the degree of vacuum in part 64 is equal to that which prevails in the idling passageway of a brand new carburetor of the same type. Each wear decreases the amount of vacuum in passageway 10, as above. The unbalance of the manometer gives an indication of the degree of wear.

If the carburetor is found acceptable, then stop screws 7 is adjusted again as during step (4) as described above.

Subject to the provision of an internal channel in the plug which is substituted for screw 14 (which plug is connected to manometer 71), the regular idling restrictor may be left in place rather than substituted with a jet 30 having a depression pick up. It is even possible to provide two channels in the plug, with a second channel opening into the induction passage and being substituted for pressure pick up 73 for connection to manometer 61.

Numerous other modifications will be apparent to those skilled in the art and should be considered as within the scope of the invention.

I claim:

1. A process for assessing wear of relatively movable parts of a carburetor for internal combustion engine in situ, said carburetor having an intake duct, a throttle in said duct, and a idling circuit opening into the intake duct at an idling orifice located downstream of a minimum opening position of the throttle and at a bypass aperture, comprising: operating the engine while maintaining the throttle in a position where said throttle defines, with the intake duct, a predetermined flow cross-sectional area for which, when the carburetor was new, an edge of said throttle was midway of said bypass aperture in the longitudinal direction thereby generating a vacuum in said idling circuit; and comparing said vacuum in the idling circuit with a predetermined reference value which is the value which prevails, under the same operating conditions, in the idling circuit of the same carburetor in new condition.

2. A process according to claim 1, wherein, during said comparison, a difference between two pressures is measured, one of said pressures being the pressure in the idling circuit and the other of said pressures being the pressure in a part located between two restrictors of pipe means communicating atmosphere and a point of the intake duct located downstream of said throttle.

3. A process according to claim 1, further comprising adjusting the position of said throttle before said comparison until a degree of vacuum at a throat of venturi means located in said intake duct is equal to a predetermined reference vacuum prevailing in a portion of pipe means connecting atmosphere and a point of the intake duct located downstream of said throttle which is located between two restrictors of predetermined cross-sectional flow areas.

4. A process according to claim 1, including an additional preliminary step of adjusting a calibrated cross-sectional flow area through which said idling circuit opens into said intake duct, by moving said throttle into a position of minimum opening for which it is entirely downstream of said bypass aperture and altering said cross-sectional flow area while the engine is idling until the degree of vacuum in the idling circuit has the same value as on the carburetor in new condition.

* * * * *